US012648035B2

(12) United States Patent (10) Patent No.: US 12,648,035 B2
Shafin et al. (45) Date of Patent: Jun. 2, 2026

(54) MAP COORDINATION OF NSTR CONSTRAINED LINKS

(71) Applicant: Samsung Electronics Co., Ltd., Suwon-si (KR)

(72) Inventors: Rubayet Shafin, Allen, TX (US); Boon Loong Ng, Plano, TX (US); Vikas Bollapragada Subrahmanya, Clemson, SC (US); Ahmed Atef Ibrahim Ibrahim, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 17/813,007

(22) Filed: Jul. 15, 2022

(65) Prior Publication Data

US 2023/0023779 A1 Jan. 26, 2023

Related U.S. Application Data

(60) Provisional application No. 63/225,218, filed on Jul. 23, 2021.

(51) Int. Cl.
*H04W 72/02* (2009.01)
*H04W 24/08* (2009.01)
(Continued)

(52) U.S. Cl.
CPC ........... *H04W 76/15* (2018.02); *H04W 24/08* (2013.01); *H04W 72/20* (2023.01); *H04W 88/10* (2013.01)

(58) Field of Classification Search
None
See application file for complete search history.

(56) References Cited

U.S. PATENT DOCUMENTS

2020/0322964 A1 10/2020 Wang et al.
2021/0144698 A1 5/2021 Kwon et al.
(Continued)

FOREIGN PATENT DOCUMENTS

EP 4072236 A1 10/2022
WO 2021112510 A1 6/2021
WO 2021145601 A1 7/2021

OTHER PUBLICATIONS

International Search Report and Written Opinion issued Oct. 31, 2022 regarding International Application No. PCT/KR2022/010536, 9 pages.

(Continued)

*Primary Examiner* — Abdullah Ahmed
*Assistant Examiner* — Ahmed Saifuddin

(57) ABSTRACT

Methods and apparatuses for facilitating multi-AP (MAP) coordination to mitigate interference caused by a link of a non-simultaneous transmit/receive (NSTR) link pair of a multi-link device (MLD) in an overlapping basic service set (OBSS) in a wireless local area network. The methods include a method performed by an access point (AP) MLD, comprising the steps of obtaining, via a backhaul link from a neighboring AP in a different BSS, a MAP coordination request that includes schedule information for a victim station (STA) in the different BSS, and modifying, based on the MAP coordination request and the schedule information, an operation mode of either the AP MLD or a non-AP MLD that forms an NSTR link pair with the AP MLD, such that a first link of the NSTR link pair is silenced during an active period of the victim STA.

20 Claims, 12 Drawing Sheets

(51) Int. Cl.
    *H04W 72/20*     (2023.01)
    *H04W 76/15*     (2018.01)
    *H04W 88/10*     (2009.01)

(56) References Cited

U.S. PATENT DOCUMENTS

| | | |
|---|---|---|
| 2021/0195540 A1 | 6/2021 | Fischer |
| 2021/0212118 A1 | 7/2021 | Lu et al. |
| 2022/0095401 A1* | 3/2022 | Lu ......................... H04L 5/0053 |
| 2022/0338253 A1* | 10/2022 | Lu ....................... H04W 74/085 |
| 2022/0345973 A1* | 10/2022 | Sun ................... H04W 74/0816 |
| 2022/0400500 A1* | 12/2022 | Xia ................... H04W 72/1268 |
| 2023/0040910 A1 | 2/2023 | Hwang et al. |
| 2023/0156840 A1* | 5/2023 | Chitrakar ............. H04W 76/15 |
| | | 370/329 |
| 2023/0308938 A1* | 9/2023 | Sun ....................... H04W 76/20 |
| 2024/0244662 A1 | 7/2024 | Kim et al. |

OTHER PUBLICATIONS

Ibrahim et al., "Multi-AP: TWT Information Sharing", doc.: IEEE 802.11-21/1046r0, Jul. 2021, 7 pages.
IEEE P802.11; 20/1935r30; Wireless LANs; "Compendium of straw polls and potential changes to the Specification Framework Document Part 2"; Jun. 2021, 368 pgs.
IEEE P802.11be/D1.0; Draft Standard for Information technology—Telecommunications and information exchange between systems Local and metropolitan area networks—Specific requirements; "Part 11: Wireless LAN Medium Access Control (MAC) and Physical Layer (PHY) Specifications"; Amendment 8: Enhancements for extremely high throughput (EHT); May 2021; 635 pgs.
Extended European Search Report issued Oct. 1, 2024 regarding Application No. 22846193.5, 9 pages.

\* cited by examiner

1025

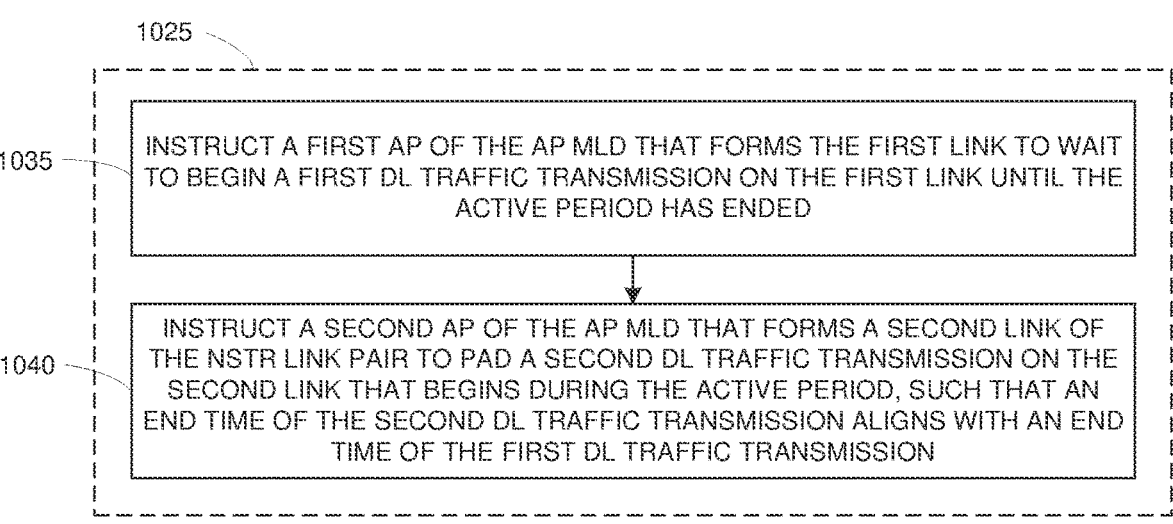

1035 — INSTRUCT A FIRST AP OF THE AP MLD THAT FORMS THE FIRST LINK TO WAIT TO BEGIN A FIRST DL TRAFFIC TRANSMISSION ON THE FIRST LINK UNTIL THE ACTIVE PERIOD HAS ENDED

1040 — INSTRUCT A SECOND AP OF THE AP MLD THAT FORMS A SECOND LINK OF THE NSTR LINK PAIR TO PAD A SECOND DL TRAFFIC TRANSMISSION ON THE SECOND LINK THAT BEGINS DURING THE ACTIVE PERIOD, SUCH THAT AN END TIME OF THE SECOND DL TRAFFIC TRANSMISSION ALIGNS WITH AN END TIME OF THE FIRST DL TRAFFIC TRANSMISSION

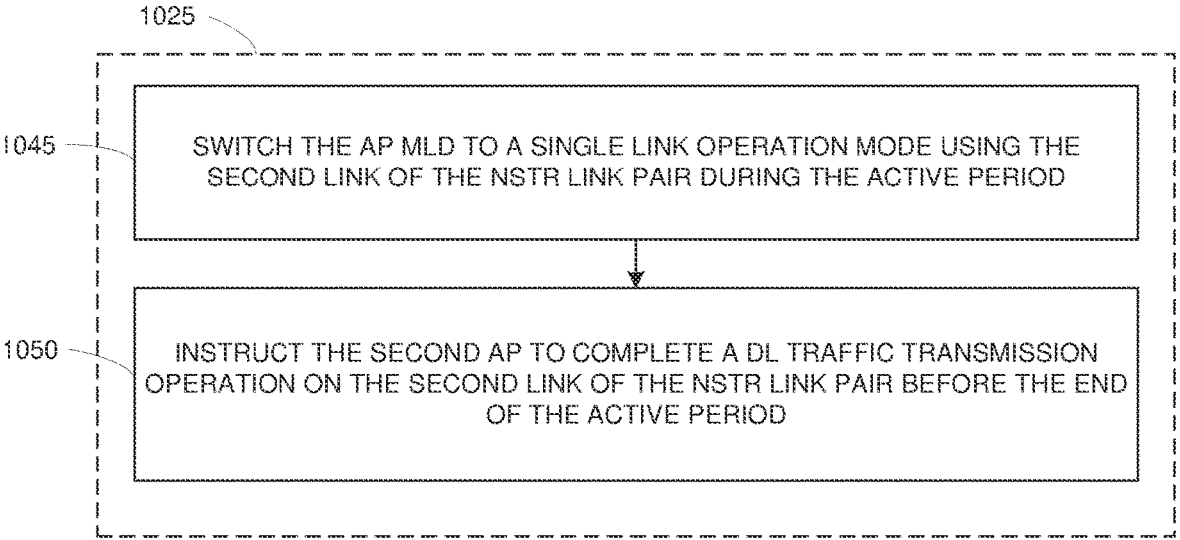

1045 — SWITCH THE AP MLD TO A SINGLE LINK OPERATION MODE USING THE SECOND LINK OF THE NSTR LINK PAIR DURING THE ACTIVE PERIOD

1050 — INSTRUCT THE SECOND AP TO COMPLETE A DL TRAFFIC TRANSMISSION OPERATION ON THE SECOND LINK OF THE NSTR LINK PAIR BEFORE THE END OF THE ACTIVE PERIOD

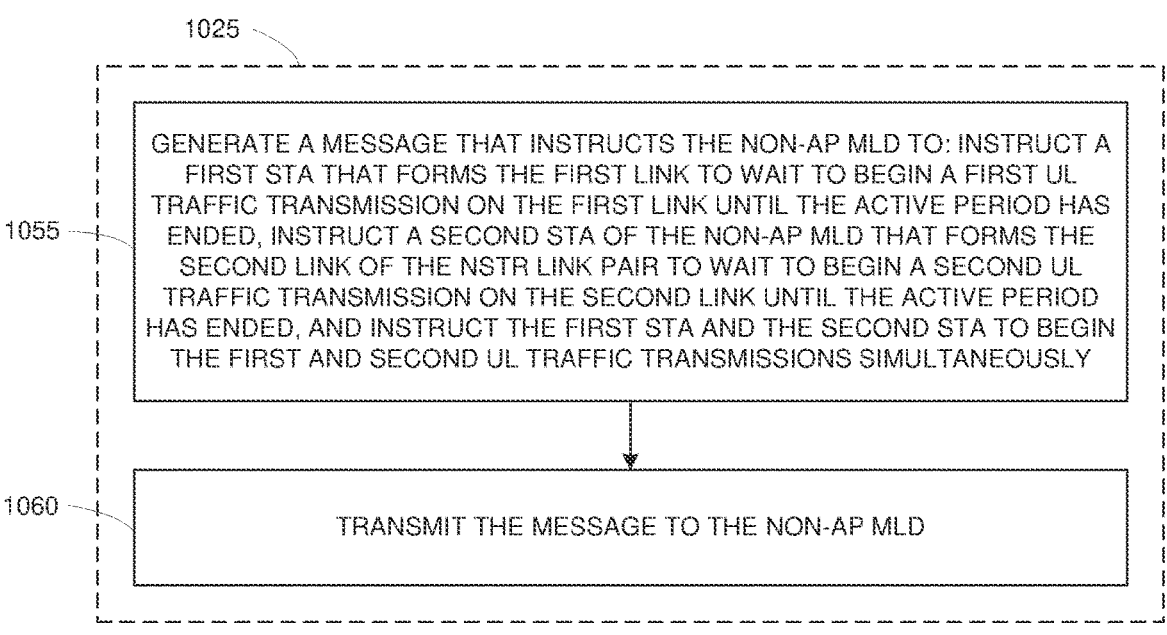

GENERATE A MESSAGE THAT INSTRUCTS THE NON-AP MLD TO: INSTRUCT A FIRST STA THAT FORMS THE FIRST LINK TO WAIT TO BEGIN A FIRST UL TRAFFIC TRANSMISSION ON THE FIRST LINK UNTIL THE ACTIVE PERIOD HAS ENDED, INSTRUCT A SECOND STA OF THE NON-AP MLD THAT FORMS THE SECOND LINK OF THE NSTR LINK PAIR TO WAIT TO BEGIN A SECOND UL TRAFFIC TRANSMISSION ON THE SECOND LINK UNTIL THE ACTIVE PERIOD HAS ENDED, AND INSTRUCT THE FIRST STA AND THE SECOND STA TO BEGIN THE FIRST AND SECOND UL TRAFFIC TRANSMISSIONS SIMULTANEOUSLY

1055

1060

TRANSMIT THE MESSAGE TO THE NON-AP MLD

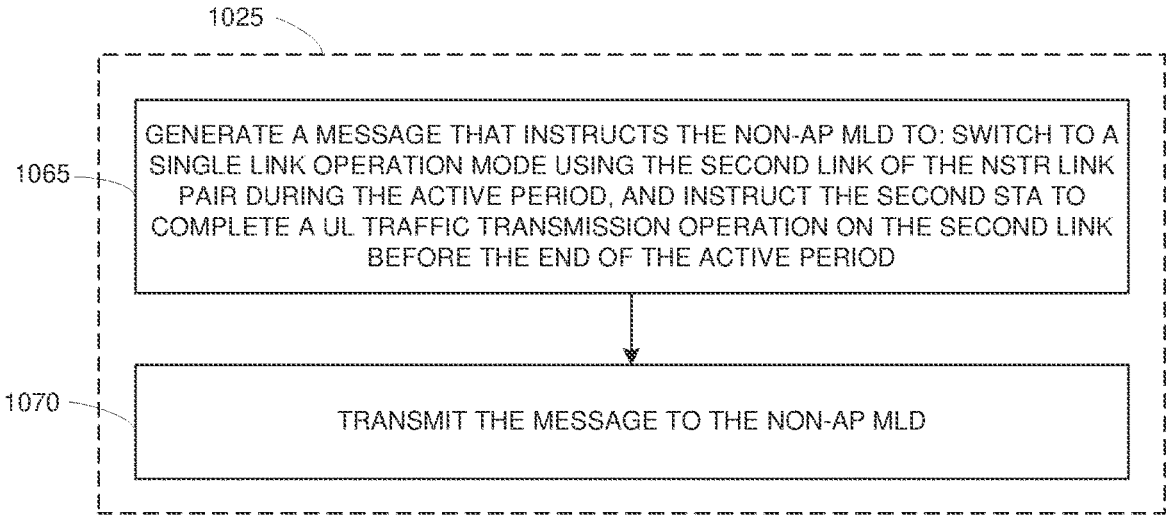

GENERATE A MESSAGE THAT INSTRUCTS THE NON-AP MLD TO: SWITCH TO A SINGLE LINK OPERATION MODE USING THE SECOND LINK OF THE NSTR LINK PAIR DURING THE ACTIVE PERIOD, AND INSTRUCT THE SECOND STA TO COMPLETE A UL TRAFFIC TRANSMISSION OPERATION ON THE SECOND LINK BEFORE THE END OF THE ACTIVE PERIOD

1065

1070

TRANSMIT THE MESSAGE TO THE NON-AP MLD

FIG. 10E

MAP COORDINATION OF NSTR CONSTRAINED LINKS

CROSS-REFERENCE TO RELATED APPLICATION(S) AND CLAIM OF PRIORITY

This application claims priority under 35 U.S.C. § 119 (e) to U.S. Provisional Patent Application No. 63/225,218 filed on Jul. 23, 2021, which is hereby incorporated by reference in its entirety.

TECHNICAL FIELD

This disclosure relates generally to interference management in wireless communications systems that include multi-link devices. Embodiments of this disclosure relate to methods and apparatuses for facilitating multi-access point (MAP) coordination to mitigate interference caused by a link of a non-simultaneous transmit/receive (NSTR) link pair of a multi-link device in an overlapping basic service set of a wireless local area network (WLAN) communications system.

BACKGROUND

WLAN technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a key feature for next generation extremely high throughput (EHT) WI-FI systems, e.g., IEEE 802.11be. The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD, thus providing an efficient way to utilize the available spectrum and achieve higher throughput than single-link operation.

MLO has two variations. The first type is simultaneous transmit/receive (STR) in which the stations (STAs) affiliated with an MLD can transmit and receive independent of each other. That is, an STR-capable MLD is able to simultaneously transmit on one link and receive on another link of an STR link pair. The second variation is NSTR in which the links formed by the STAs affiliated with an MLD do not form an STR link pair. If a link pair constitutes an NSTR link pair, transmission on one link can cause interference to the other link due to signal leakiness which the device's radio transceiver is unable to withstand. Consequently, an MLD is unable to simultaneously transmit on one link and receive on another link of an NSTR link pair. Since the STR mode of operation requires two or more radios with sufficient isolation, it is expected that AP MLDs will have STR capabilities while non-AP MLDs are more likely not to be capable of STR, and thus use NSTR.

MAP coordination is one of the most important features for interference management in WI-FI (wireless fidelity) networks, which was developed by IEEE 802.11ax. The presence of multiple APs in dense networks leads to overlapping basic service sets (OBSSs). The STAs belonging to these overlapping coverage areas may suffer from poor performance due to inter-BSS interference. MAP coordination allows multiple APs belonging to OBSSs to exchange information amongst themselves to mitigate this interference. Some of the MAP schemes being considered in IEEE 802.11be are coordinated spatial reuse (CSR) and coordinated OFDMA. In coordinated spatial reuse the neighboring APs are able to negotiate transmission power to reduce the interference at suffering STAs. In coordinated OFDMA an AP that obtains a transmission opportunity (TXOP) can share its frequency resources with other APs, leading to orthogonal transmissions between neighboring APs. Another option that incurs low overhead is for neighboring APs to schedule their respective transmissions to be non-overlapping in time to avoid interference.

SUMMARY

Embodiments of the present disclosure provide methods and apparatuses for facilitating MAP coordination to mitigate interference caused by a link of an NSTR link pair of an MLD in an OBSS of a wireless local area network.

In one embodiment, an AP MLD is provided, comprising APs and a processor operably coupled to the APs. The APs each comprise a transceiver configured to form a link with a corresponding STA of a non-AP MLD, and at least two of the links form an NSTR link pair. The processor is configured to obtain, via a backhaul link from a neighboring AP in a different BSS, a MAP coordination request that includes schedule information for a victim STA in the different BSS, and modify, based on the MAP coordination request and the schedule information, an operation mode of either the AP MLD or the non-AP MLD such that a first link of the NSTR link pair is silenced during an active period of the victim STA.

In another embodiment, a non-AP MLD is provided, comprising STAs and a processor operably coupled to the STAs. The STAs each comprise a transceiver configured to form a link with a corresponding AP of an AP MLD, and at least two of the links form an NSTR link pair. The processor is configured to modify, based on a MAP coordination request and schedule information for a victim STA in a different BSS that is transmitted to the AP MLD by a neighboring AP in the different BSS, an operation mode of the non-AP MLD such that a first link of the NSTR link pair is silenced during an active period of the victim STA.

In another embodiment, a method performed by an AP MLD is provided, including the steps of obtaining, via a backhaul link from a neighboring AP in a different BSS, a MAP coordination request that includes schedule information for a victim STA in the different BSS, and modifying, based on the MAP coordination request and the schedule information, an operation mode of either the AP MLD or a non-AP MLD that forms an NSTR link pair with the AP MLD, such that a first link of the NSTR link pair is silenced during an active period of the victim STA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein:

[1] IEEE 802.11-20/1935r30, "Compendium of straw polls and potential changes to the Specification Framework Document-Part 2", June 2021.

[2] IEEE P802.11be™/D1.0, "Draft Standard for Information technology—Telecommunications and information exchange between systems Local and metropolitan area networks—Specific requirements-Part 11: Wireless LAN Medium Access Control (MAC) and Physical Layer (PHY) Specifications—Amendment 8: Enhancements for extremely high throughput (EHT)", May 2021.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A-10E illustrate an example process for facilitating MAP coordination to mitigate interference caused by a link of an NSTR link pair of an MLD in an OBSS in a WLAN according to various embodiments of the present disclosure.

DETAILED DESCRIPTION

FIGS. 1 through 10E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that an MLO link (formed between a non-AP MLD and an AP MLD in one BSS) that is part of an NSTR link pair may cause interference with a victim link between an AP and a STA of a neighboring OBSS in a dense networking environment. MAP coordination between the neighboring AP and AP MLD could be used to avoid this interference by changing downlink (DL) or uplink (UL) scheduling of the interfering link between the AP MLD and the non-AP MLD based on information about the DL or UL scheduling of the victim link that is delivered by the neighboring AP to the AP MLD. For example, a MAP coordination request from the AP to the neighboring AP MLD could request that an interfering MLO link between the AP MLD and the non-AP MLD be silenced during active periods (e.g., target wake time (TWT) service periods (SP)) of the victim link.

Embodiments of the present disclosure also recognize, however, that when MLO links formed between a non-AP MLD and an AP MLD constitute an NSTR link pair, the non-AP MLD STAs that form links of the NSTR link pair require DL physical layer protocol data unit (PPDU) end time alignment and UL PPDU start time alignment on the NSTR link pair. Accordingly, in order for the AP MLD to accept a MAP coordination request as discussed above, the AP MLD is able to align the end time of DL PPDU transmissions or the start time of UL PPDU transmissions on the interfering link.

Accordingly, embodiments of the present disclosure provide apparatuses and methods that facilitate such MAP coordination between an AP of a BSS and a neighboring AP MLD of an OBSS to mitigate interference caused by a link of an NSTR link pair formed between the AP MLD and a non-AP MLD in the OBSS. These apparatuses and methods define the behavior of the other NSTR link in the link pair (referred to as "Link 2" herein) when the interfering link of the NSTR link pair (referred to as "Link 1" herein) is silenced to avoid inter-BSS interference based on a MAP coordination request. For example, the disclosure provides embodiments of a MAC-level procedure to define the behavior of an AP MLD and a non-AP MLD on Link 2 of an NSTR link pair during the duration for which the Link 1 is silenced by the AP MLD.

Figure 1:
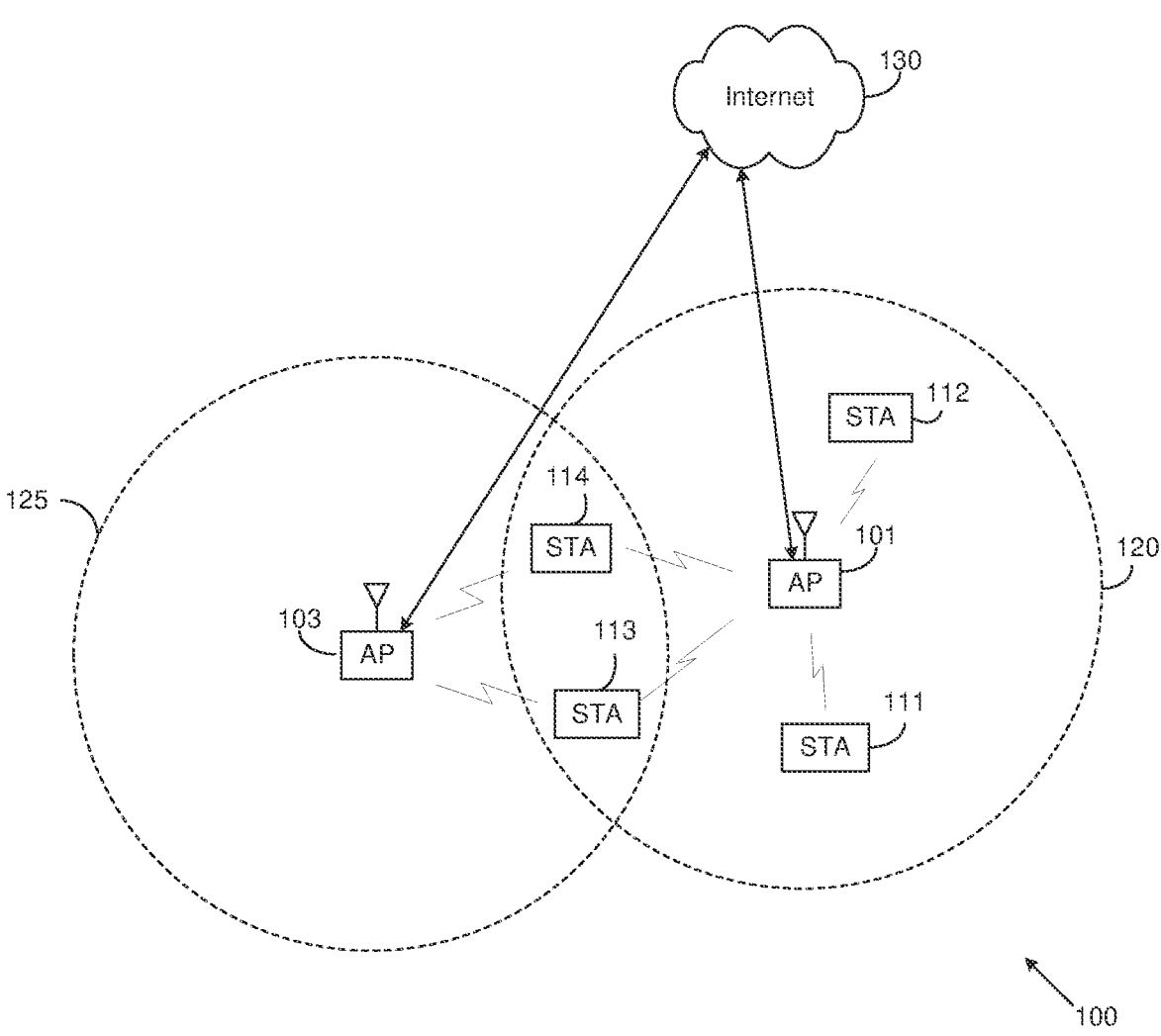
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, at least one of the APs 101 and 103 and at least one of the STAs 111-114 may be an MLD. In such embodiments, AP 101 may be an AP MLDs, and STA 111 may be a non-AP MLD. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions. The coverage areas 120 and 125 may be considered to correspond to BSSs of the associated APs 101 and 103, respectively. Coverage area 120 may be considered an OBSS with respect to the BSS of AP 103, and vice versa for the coverage area 125 with respect to the BSS of AP 101.

As described in more detail below, one or more of the APs may include circuitry and/or programming for facilitating MAP coordination to mitigate interference caused by a link of an NSTR link pair of an MLD in an OBSS in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
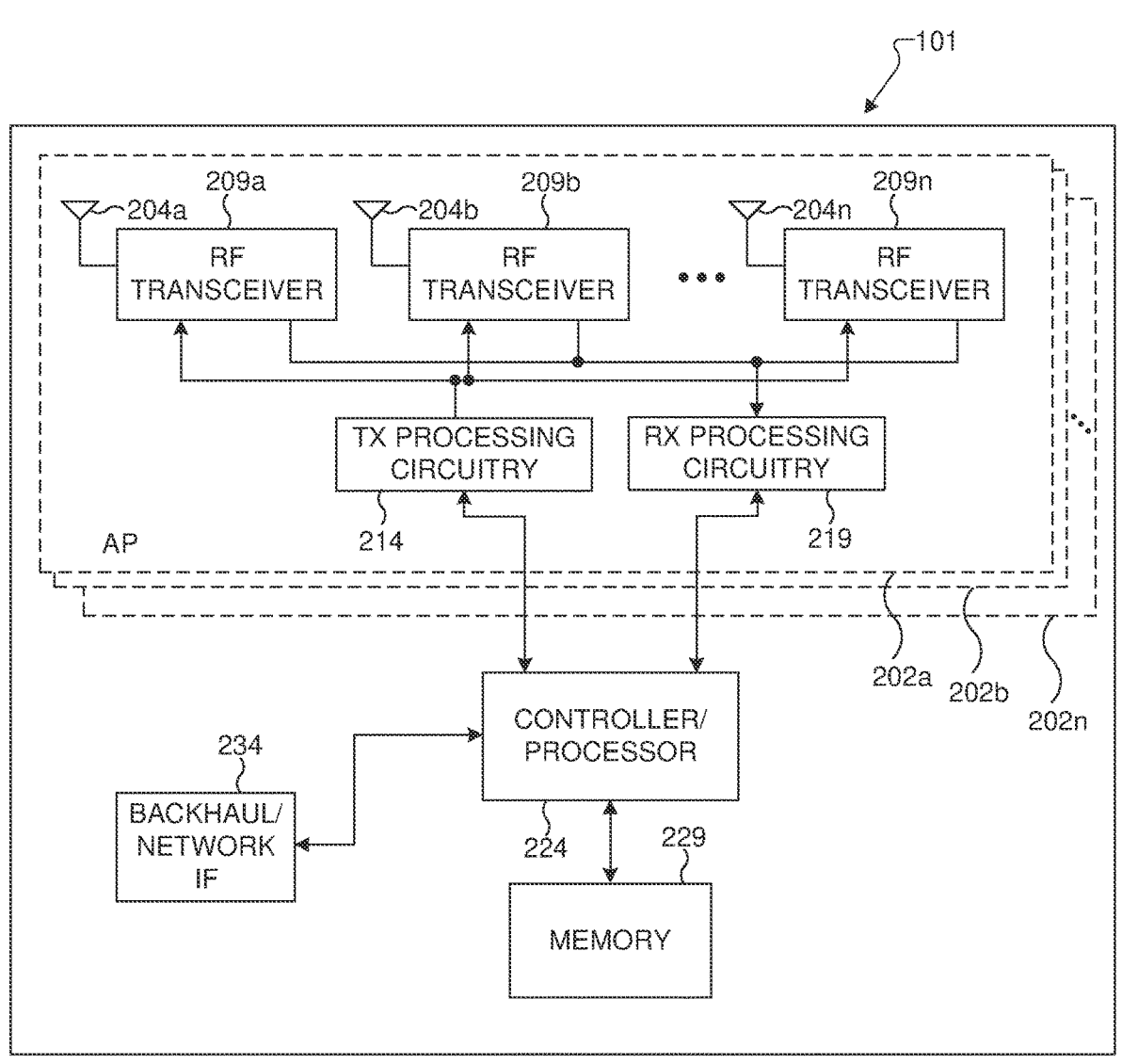
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX)

processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHZ, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHZ, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating MAP coordination to mitigate interference caused by a link of an NSTR link pair of an MLD in an OBSS in WLANs. In some embodiments, the controller/processor 224 includes at least one microprocessor or microcontroller. The controller/processor 224 is also capable of executing programs and other processes resident in the memory 229, such as an OS.

The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating MAP coordination to mitigate interference caused by a link of an NSTR link pair of an MLD in an OBSS in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs. For example, if AP 101 is not an AP MLD, the APs 202b-202n may be omitted.

Figure 2B:
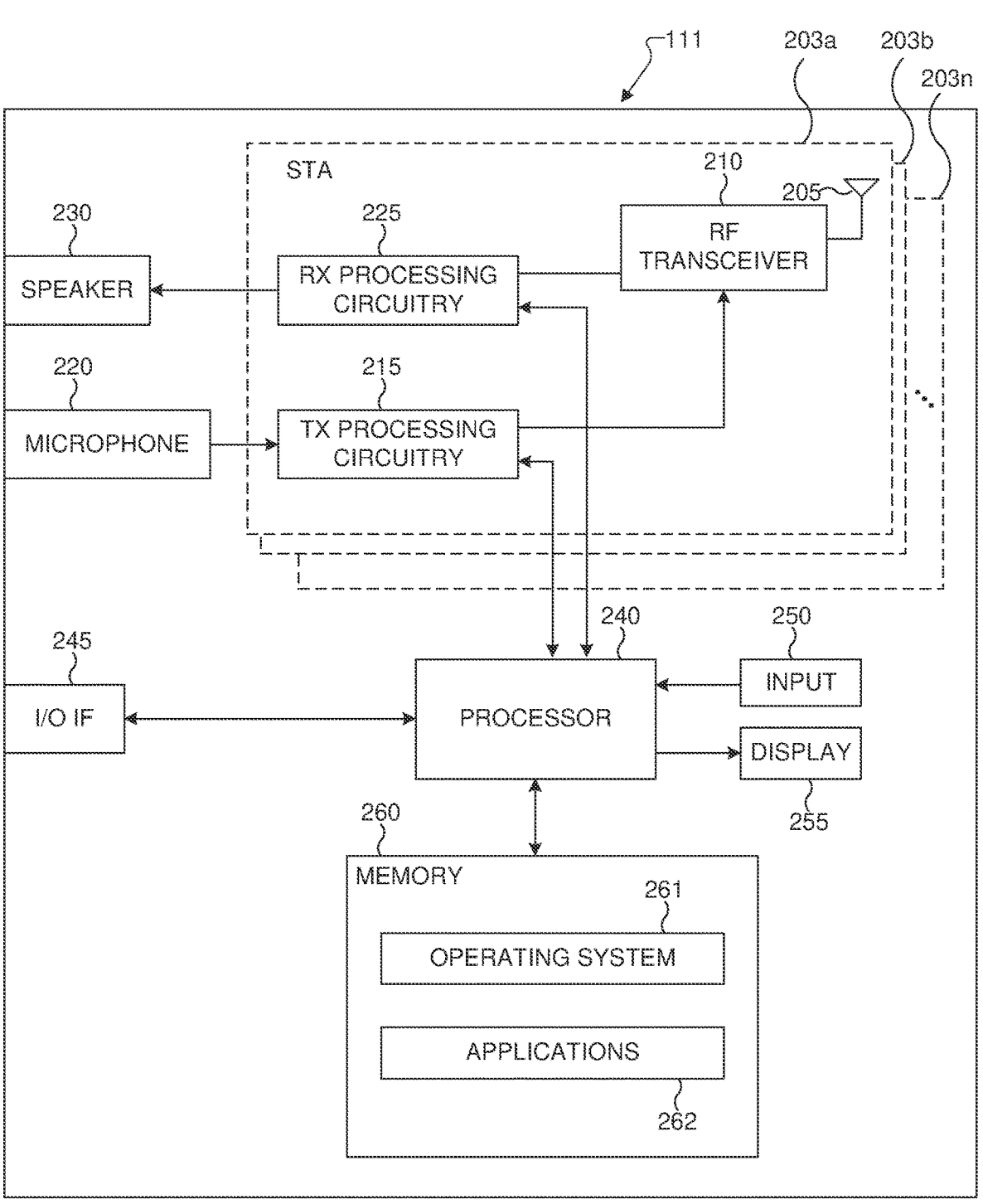
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHZ, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate MAP coordination to mitigate interference caused by a link of an NSTR link pair of an MLD in an OBSS in WLANs. In some embodiments, the controller/processor 240 includes at least one microprocessor or microcontroller.

The controller/processor 240 is also capable of executing other processes and programs resident in the memory 260, such as operations for facilitating MAP coordination to mitigate interference caused by a link of an NSTR link pair of an MLD in an OBSS in WLANs. The controller/processor 240 can move data into or out of the memory 260 as required by an executing process. In some embodiments, the controller/processor 240 is configured to execute a plurality of applications 262, such as applications for facilitating MAP coordination to mitigate interference caused by a link of an NSTR link pair of an MLD in an OBSS in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). In embodiments in which the STA 111 is not an MLD, the STAs 203b-203n may be omitted. Also, while FIG. 2B illustrates the non-AP MLD 111 configured as a mobile telephone or smartphone, non-AP MLDs can be configured to operate as other types of mobile or stationary devices.

As discussed above, in dense networks multiple APs operate in the vicinity of each other, and in these scenarios OBSS interference is prevalent. In this disclosure a link suffering from OBSS interference is referred to as a victim link (or suffering link) and the STA associated with this link is referred to as a victim STA (or suffering STA).

To improve the performance of the victim link, the AP associated with it could begin a MAP negotiation with the interfering AP. During this MAP negotiation the schedule of the victim STA is announced to the interfering AP asking it to silence the interfering link for the duration for which the victim link is active. In this disclosure it is assumed that the AP initiating the MAP coordination request knows the schedule of the victim link. For example, the schedule can be predicted by the AP based on power saving schemes like TWT and PSM that are established between the AP and the victim STA. It is also assumed that the interfering link forms an NSTR link pair with another link in an MLD. The embodiments discussed below detail the behavior of an AP MLD and its associated non-AP MLD upon receiving such a MAP coordination request.

Figure 3A:
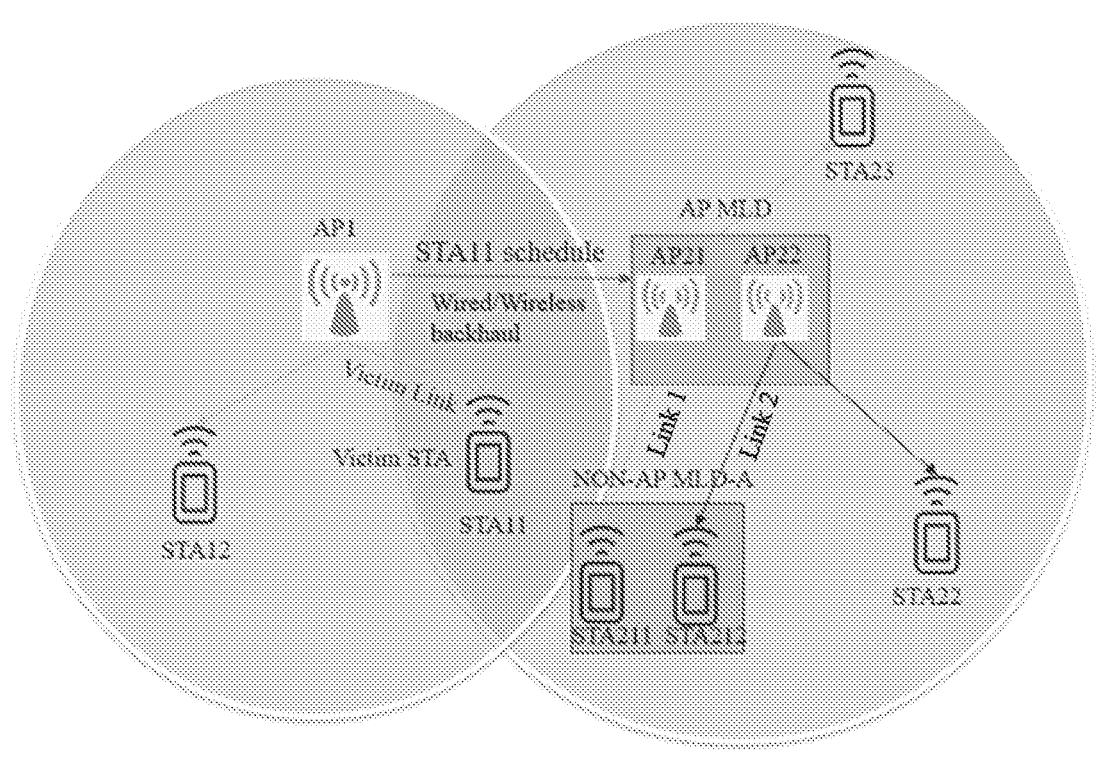
FIG. 3A illustrates an example scenario of inter-BSS interference and MAP coordination according to embodiments of the present disclosure.

FIG. 3A illustrates an example scenario of inter-BSS interference and MAP coordination according to embodiments of the present disclosure. The example scenario of FIG. 3A may be a specific example of the wireless network 100 of FIG. 1. For example, AP1 (which is a single link AP) may correspond to AP 103, STA11 (which is a single link STA) may correspond to STA 113, the AP MLD may correspond to AP MLD 101, and the non-AP MLD-A may correspond to non-AP MLD 111. For case of explanation, the AP MLD is illustrated with two affiliated APs and the non-AP MLD-A is illustrated with two affiliated non-AP STAS, but it is understood that this process could be applied with suitable MLDs having any number of affiliated APs or STAs.

In the example scenario illustrated in FIG. 3A AP1 is serving STA11 and an AP MLD is serving a non-AP MLD-A over an NSTR link pair comprised of Link 1 formed between AP21 and STA211 and Link 2 formed between AP22 and STA212. Link 1 between AP21 and STA211 (the interfering link) causes OBSS interference at STA1 (the victim STA)

which deteriorates the link quality between AP1 and STA1 (the victim link) due to the observed interference.

Figure 3B:
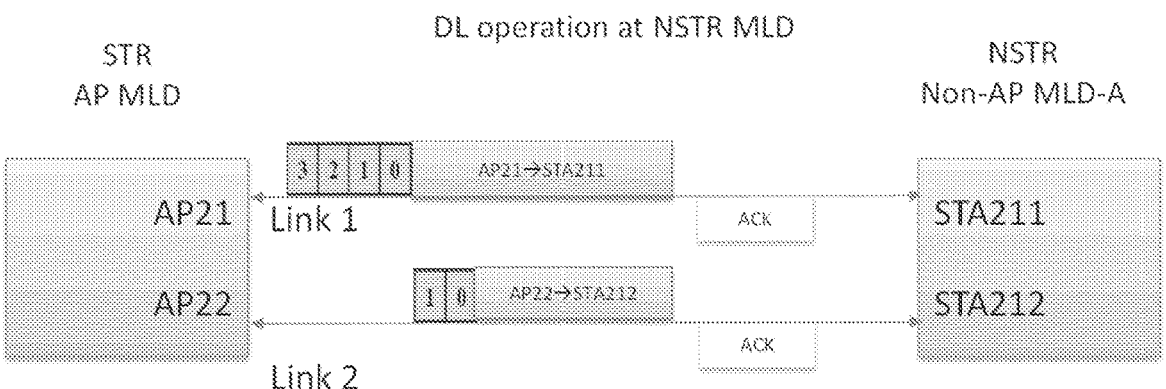
FIG. 3B illustrates an example timing diagram for DL operation of an NSTR link pair according to embodiments of the present disclosure.
Figure 3C:
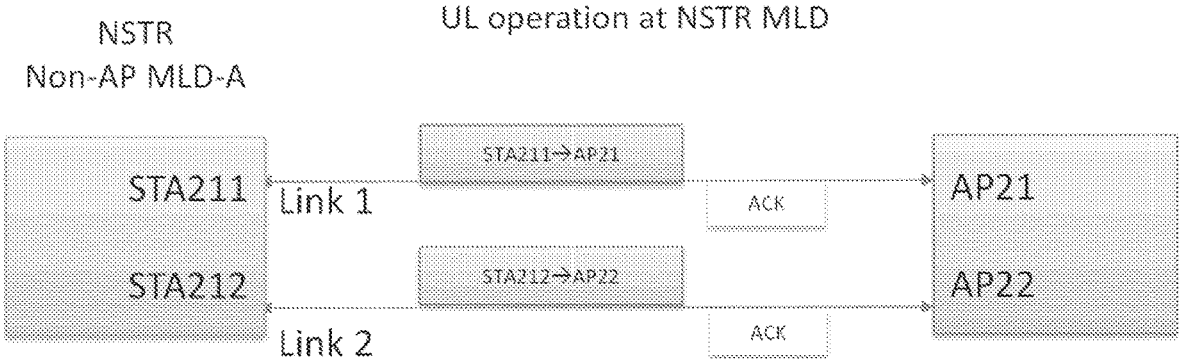
FIG. 3C illustrates an example timing diagram for UL operation of an NSTR link pair according to embodiments of the present disclosure.

FIGS. 3B and 3C illustrate example timing diagrams for transmissions on an NSTR link pair according to embodiments of the present disclosure. The examples of FIGS. 3B and 3C are based on the example scenario of FIG. 3A and represent operations of the AP MLD and non-AP MLD-A without consideration of any OBSS interference.

FIG. 3B illustrates an example timing diagram for DL operation of an NSTR link pair according to embodiments of the present disclosure. The example of FIG. 3B illustrates the NSTR constraint that end times of DL transmissions on all links of the NSTR link pair (Link 1 and Link 2) from the STR AP MLD to the NSTR non-AP MLD-A are synchronized. In particular, FIG. 3B shows that each of AP21 and AP22 of the AP MLD operate separate backoff counters for DL transmissions to non-AP MLD-A, and when a backoff counter reaches 0 the corresponding AP begins sending a DL transmission (e.g., a DL PPDU). However, even when AP21 and AP22 begin their respective DL transmissions at different times, they synchronize the end times of their DL transmissions.

FIG. 3C illustrates an example timing diagram for UL operation of an NSTR link pair according to embodiments of the present disclosure. The example of FIG. 3C illustrates the NSTR constraint that start times of UL transmissions on all links of the NSTR link pair (Link 1 and Link 2) from the NSTR non-AP MLD-A to the AP MLD are synchronized. In particular, FIG. 3C shows that each of STA211 and STA212 of the non-AP MLD-A synchronize the start times of their respective UL transmissions to the AP MLD.

Figure 4:
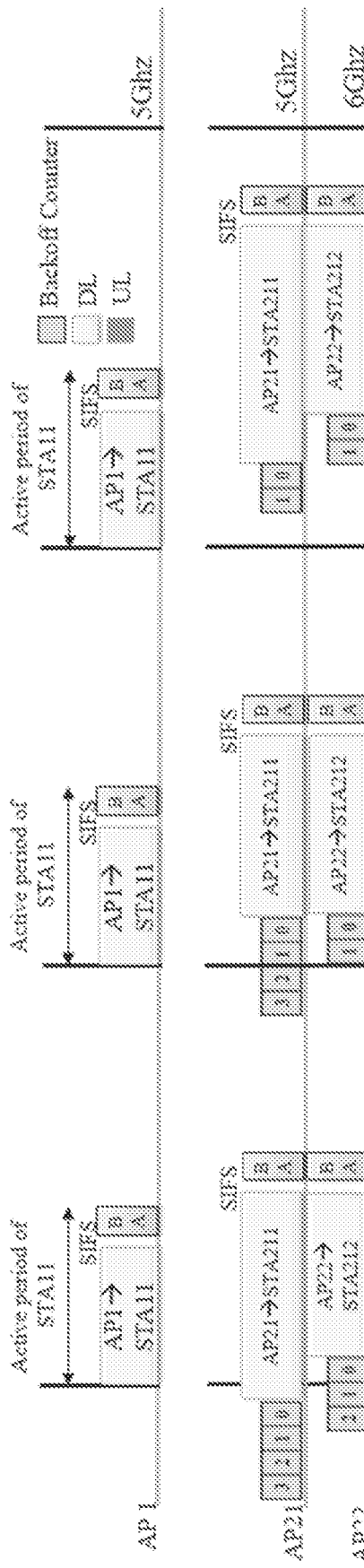
FIG. 4 illustrates an example timing diagram for transmissions on a victim link and on links of an interfering NSTR link pair in a neighboring OBSS according to embodiments of the present disclosure.

FIG. 4 illustrates an example timing diagram for transmissions on a victim link and on links of an interfering NSTR link pair in a neighboring OBSS according to embodiments of the present disclosure. The example of FIG. 4 is based on the example scenario of FIG. 3A. In this example, there is either a full or a partial overlap between when the victim link (AP1 to STA11) and the interfering Link 1 (AP 21 to STA211) are active. For ease of explanation, this example illustrates DL transmissions on the interfering link, but it is understood that UL transmissions on the interfering link may cause similar interference at the victim link.

According to various embodiments, STA11 can notify AP1 about the OBSS interference caused by DL transmissions from the AP MLD on Link 1, and AP1 can react by sending a MAP coordination request which includes the schedule of STA11 to the interfering AP MLD over the backhaul, requesting that Link 1 be silenced during the active period of the victim link. The AP MLD can either accept or reject this MAP coordination request. The embodiments discussed below assume that the MAP coordination request is accepted.

According to various embodiments, if the AP MLD chooses to accept the MAP coordination request it will first determine if DL transmission from the AP MLD to the non-AP MLD or UL transmission from the non-AP MLD to the AP MLD is responsible for the OBSS interference.

In embodiments involving DL interference, the AP MLD imposes constraints on itself to cooperate with AP1. While the victim link is not active the AP MLD operation is not altered, with the exception that any DL transmission from the AP MLD to the non-AP MLD-A is terminated before the victim link becomes active. During the active period of the victim link, the AP MLD modifies its operation to silence DL transmissions on Link 1 (AP 21 to STA211). For ease of explanation, such modified operation of the AP MLD is referred to as a DL silence mode.

Figures 5, 6:
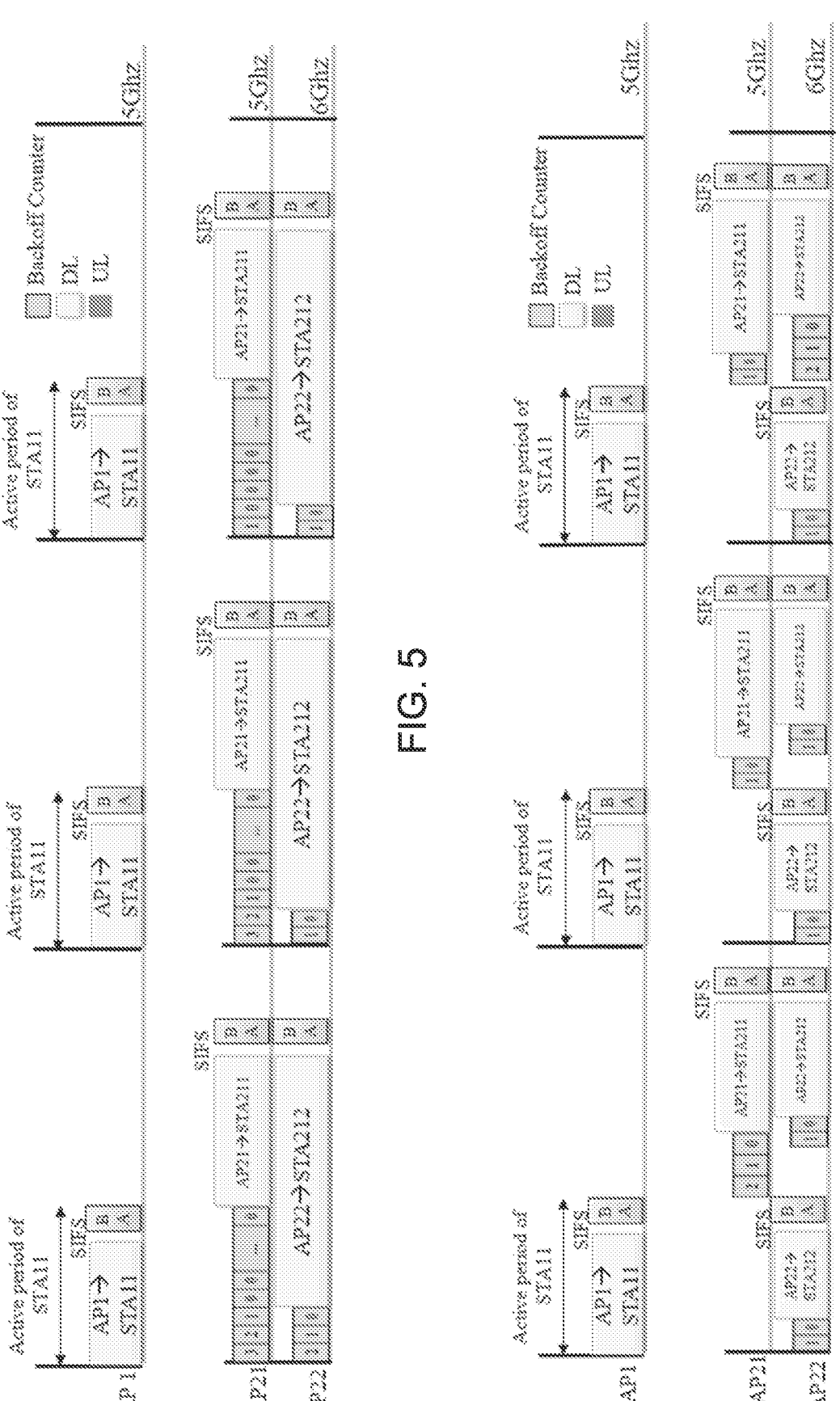
FIG. 5 illustrates an example timing diagram for a DL silence mode of an interfering link according to embodiments of the present disclosure.
FIG. 6 illustrates an example timing diagram for another DL silence mode of an interfering link according to embodiments of the present disclosure.

FIG. 5 illustrates an example timing diagram for a DL silence mode of an interfering link according to embodiments of the present disclosure. The example timing diagram of FIG. 5 is a modification of the example timing diagram of FIG. 4. The operation of the AP MLD in this example is referred to as DL silence mode 1.

As illustrated in FIG. 5, in DL silence mode 1, AP21 (the AP associated with Link 1) can countdown its backoff counter during the active period of the victim link, however, when the backoff counter reaches zero it is held at zero until the end of the active period of the victim link (i.e., the end of the active period of STA11). Meanwhile, AP22 (the AP associated with Link 2) is free to begin its transmission as soon at its backoff counter reaches zero.

In order to conform to the NSTR constraint that requires DL PPDU end time alignment, AP22 and AP21 negotiate an end time alignment for their DL transmissions on Link 1 and Link 2 based on when AP21 is able to begin its DL transmission and the length of the DL transmission. AP22 may then need to add padding to its DL transmission in order to synchronize the end time of its DL PPDU with that of AP21.

FIG. 6 illustrates an example timing diagram for another DL silence mode of an interfering link according to embodiments of the present disclosure. The example timing diagram of FIG. 6 is a modification of the example timing diagram of FIG. 4. The operation of the AP MLD in this example is referred to as DL silence mode 2.

As illustrated in FIG. 6, in DL silence mode 2 the AP MLD switches to a single link operation wherein only Link 2 is active during the active period of the victim link. The DL transmission on Link 2 and its corresponding UL ACK finishes before the end of the victim link's active period (i.e., the end of the active period of STA11). At the end of the victim link's active period the AP MLD switches to multi-link operation.

Although the end times of the DL PPDUs transmitted by AP21 and AP22 during multi-link operation in DL silence mode 2 still need to be aligned, there will be less padding overhead incurred by AP 22 in this mode as compared to DL silence mode 1.

In embodiments of FIG. 3A involving UL interference (e.g., when a UL transmission between STA211 and AP21 is interfering with the DL transmission from AP1 to STA1), when the AP MLD receives (and accepts) the MAP coordination request it sends the non-AP MLD-A a message imposing constraint on the non-AP MLD-A to alter its operation to cooperate with AP1. In such embodiments, the non-AP MLD-A's operation outside of the active period of the victim link is not altered, with the exception that any UL transmission from the non-AP MLD-A to the AP MLD that begins outside of the active period ends before the beginning of the active period. During the active period of the victim link the non-AP MLD-A modifies its operation to silence UL transmissions on Link 1 (STA211 to AP 21). For ease of explanation, such modified operation of the non-AP MLD-A is referred to as a UL silence mode.

Figures 7, 8:
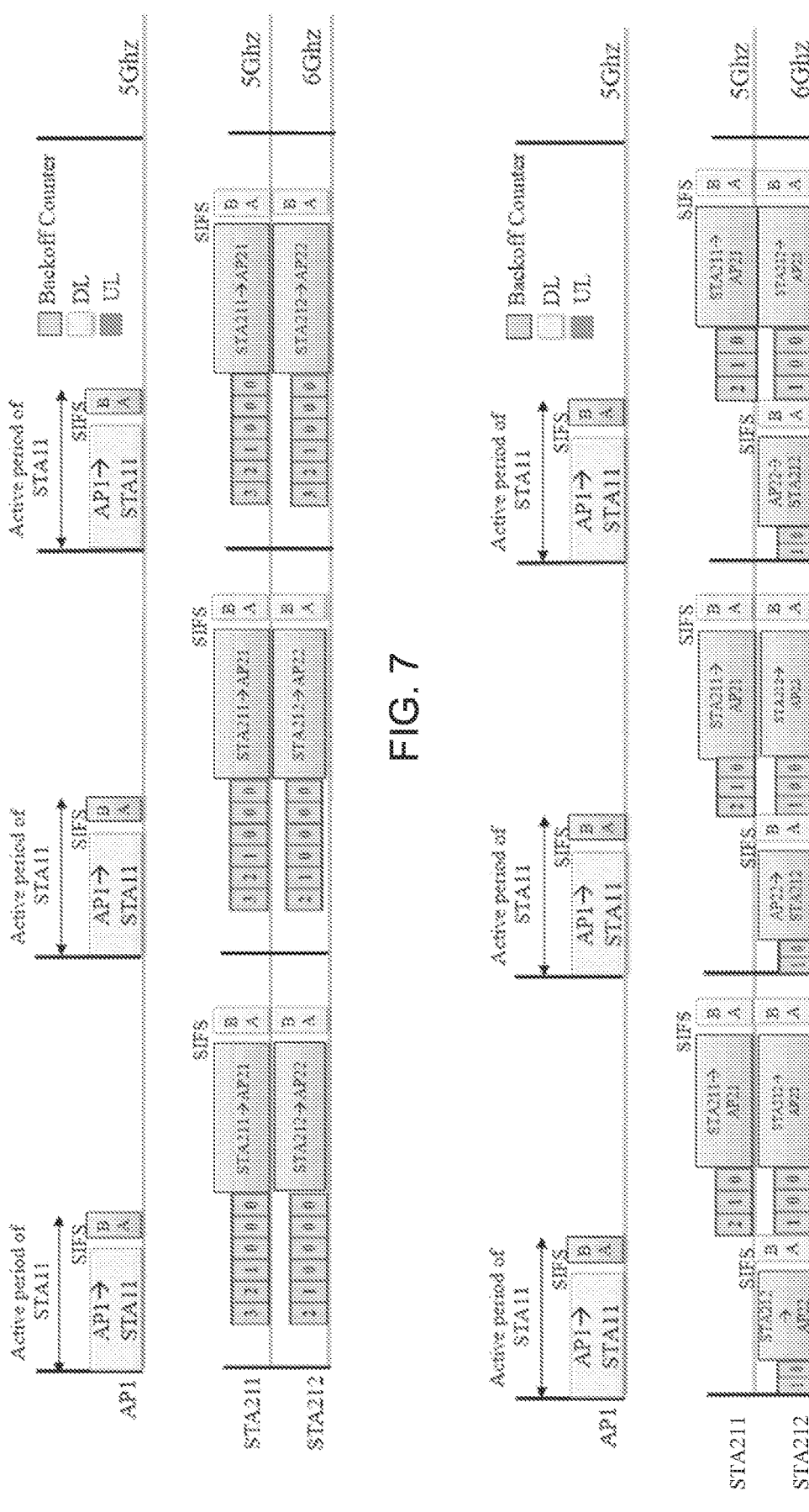
FIG. 7 illustrates an example timing diagram for a UL silence mode of an interfering link according to embodiments of the present disclosure.
FIG. 8 illustrates an example timing diagram for another UL silence mode of an interfering link according to embodiments of the present disclosure.

FIG. 7 illustrates an example timing diagram for a UL silence mode of an interfering link according to embodiments of the present disclosure. The example of FIG. 7 is based on the example scenario of FIG. 3A, and represents a modification of FIG. 4 to illustrate UL transmissions from the non-AP MLD-A to the AP MLD in place of the DL transmissions of FIG. 4 from the AP MLD to the non-AP MLD-A. The operation of the non-AP MLD-A in this example is referred to as UL silence mode 1.

As illustrated in FIG. 7, in UL silence mode 1, if the backoff counters of any STAs of the non-AP MLD-A (e.g., STA211 or STA212) reach zero during the active period of the victim link (i.e., the active period of STA11) they are kept at zero until the end of the active period of the victim link, and UL transmission on Link 1 and Link 2 can begin after the end of the active period. By silencing Link 2 when Link 1 is silenced for MAP cooperation, the NSTR constraint that requires alignment of the start times of the UL PPDUs of Link 1 and Link 2 is met. However, this results in an inefficient use of Link 2.

FIG. 8 illustrates an example timing diagram for another UL silence mode of an interfering link according to embodiments of the present disclosure. The example of FIG. 8 is based on the example scenario of FIG. 3A, and represents a modification of FIG. 4 to illustrate UL transmissions from the non-AP MLD-A to the AP MLD in place of the DL transmissions of FIG. 4 from the AP MLD to the non-AP MLD-A. The operation of the non-AP MLD-A in this example is referred to as UL silence mode 2.

As illustrated in FIG. 8, in UL silence mode 2 the non-AP MLD-A switches to single-link operation wherein only Link 2 is active during the active period of the victim link. The UL transmission on Link 2 and its corresponding DL ACK finishes before the end of the victim link's active period (i.e., the end of the active period of STA11). At the end of the victim link's active period the non-AP MLD-A switches to multi-link operation. Although the start times of the UL PPDUs transmitted by STA211 and STA212 during multi-link operation in UL silence mode 2 still need to be aligned, the use of Link 2 in this mode is more efficient as compared to UL silence mode 1.

Figure 9:
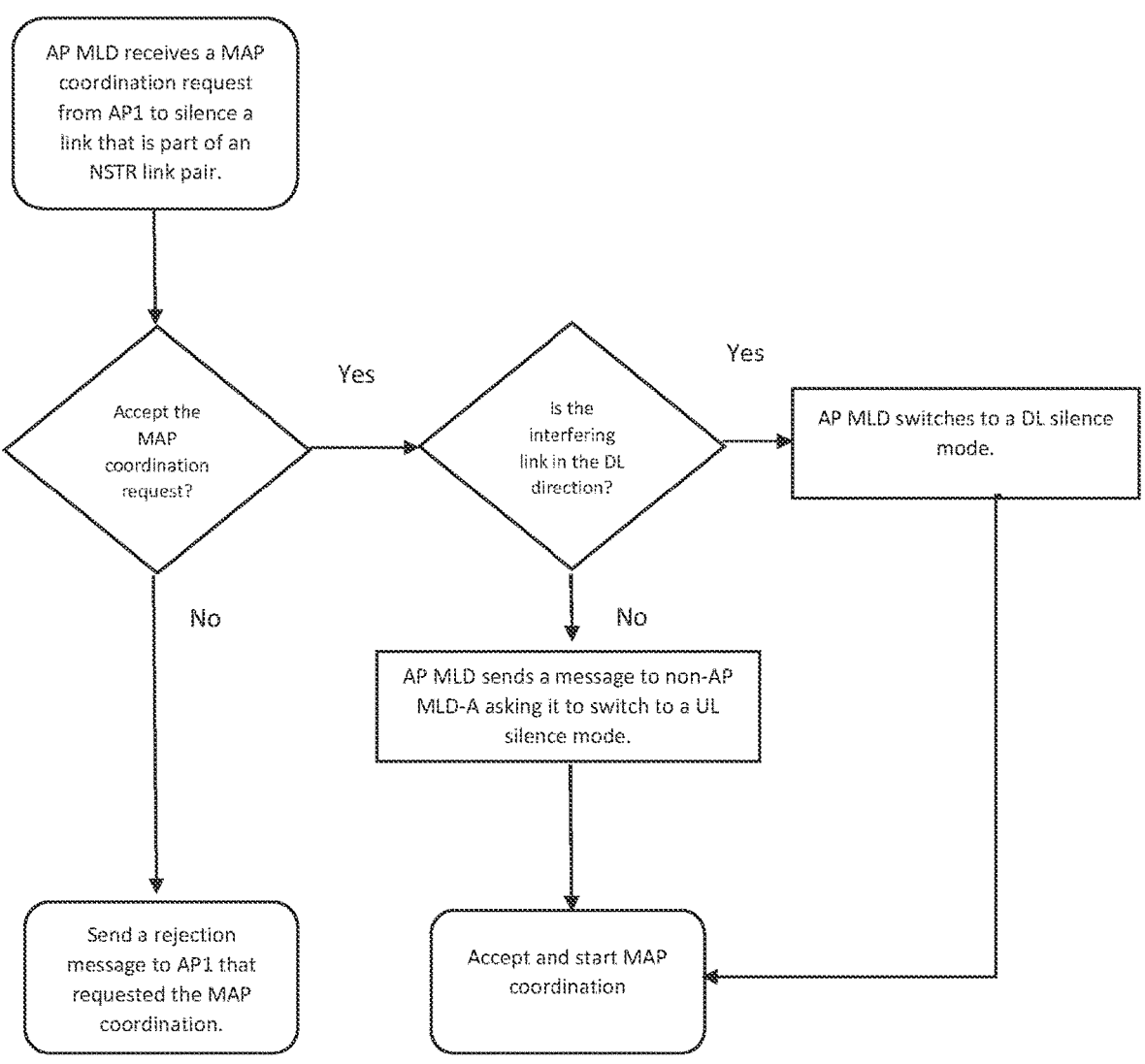
FIG. 9 illustrates an example procedure for MAP coordination between the neighboring AP and AP MLD according to the above embodiments of the present disclosure.

FIG. 9 illustrates an example procedure for MAP coordination between the neighboring AP and AP MLD according to the above embodiments of the present disclosure. The example procedure of FIG. 9 incorporates the embodiments of FIGS. 4-8.

FIGS. 10A-10E illustrate an example process for facilitating MAP coordination to mitigate interference caused by a link of an NSTR link pair of an MLD in an OBSS in a WLAN according to various embodiments of the present disclosure. The process of FIGS. 10A-10E is discussed as being performed by an AP MLD, but it is understood that a corresponding neighboring AP and a corresponding non-AP MLD perform corresponding processes. Additionally, for convenience, the process of FIGS. 10A-10E is discussed as being performed by a WI-FI AP MLD comprising a plurality of APs that each comprise a transceiver configured to form a link with a corresponding STA of a non-AP MLD, wherein at least two of the links form an NSTR link pair. However, it is understood that any suitable wireless communication device could perform these processes.

Figure 10A:
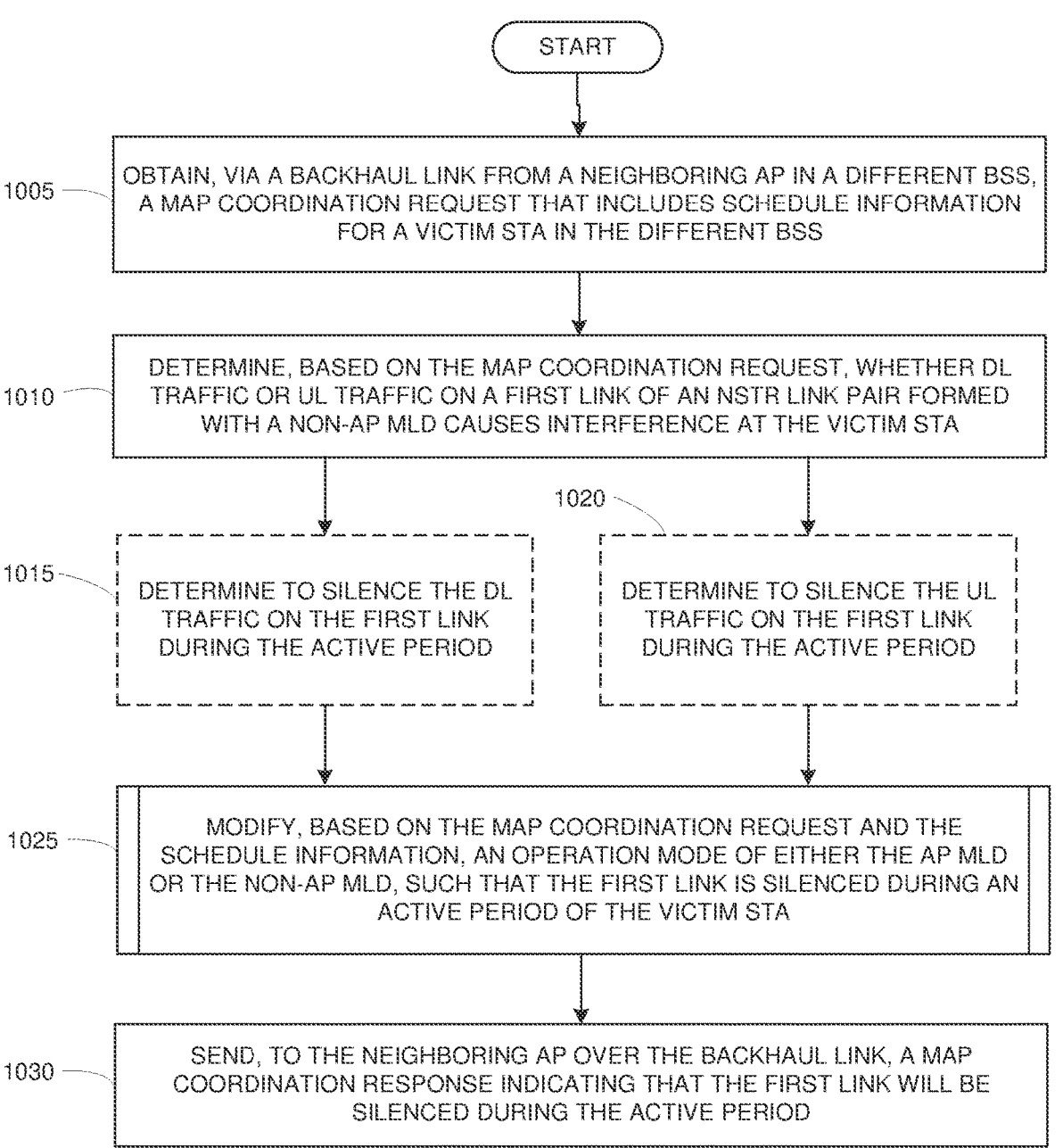

Referring to FIG. 10A, the process begins with the AP MLD obtaining, via a backhaul link from a neighboring AP in a different BSS, a MAP coordination request that includes schedule information for a victim STA in the different BSS (step 1005). The MAP coordination request may be a request for the AP MLD to coordinate with the neighboring AP to avoid interference that the victim STA has observed which was caused by a non-AP MLD in the AP MLD's BSS. The schedule information could include, for example, a TWT schedule of the victim STA that indicates active periods of the victim STA, such as TWT SPs.

The AP MLD may then determine, based on the MAP coordination request, whether DL traffic or UL traffic on a first link of an NSTR link pair formed with a non-AP MLD causes interference at the victim STA (step 1010). The non-AP MLD is in the AP MLD's BSS, and the MAP coordination request may indicate that the victim STA observed interference caused by the first link.

If the AP MLD determined at step 1010 that DL traffic causes the interference, then at step 1015 the AP MLD determines to silence the DL traffic on the first link during the active period.

If the AP MLD determined at step 1010 that UL traffic causes the interference, then at step 1020 the AP MLD determines to silence the UL traffic on the first link during the active period.

At step 1025, the AP MLD modifies, based on the MAP coordination request and the schedule information, an operation mode of either the AP MLD or the non-AP MLD that forms the NSTR link pair with the AP MLD, such that the first link of the NSTR link pair is silenced during the active period of the victim STA. Depending on the determinations made at steps 1010-1020, the AP MLD may perform different actions at step 1025, as discussed further with respect to FIGS. 10B-10E.

Referring now to FIG. 10B, if the AP MLD determined to silence the DL traffic on the first link at step 1015, then at step 1025 the AP MLD may modify the operation mode of the AP MLD itself to enter a DL silence mode (e.g., DL silence mode 1).

To do so, the AP MLD may instruct a first AP of the AP MLD that forms the first link to wait to begin a first DL traffic transmission on the first link until the active period has ended (step 1035), and instruct a second AP of the AP MLD that forms a second link of the NSTR link pair to pad a second DL traffic transmission on the second link that begins during the active period, such that an end time of the second DL traffic transmission aligns with an end time of the first DL traffic transmission (step 1040). DL traffic is thereby silenced on the first link during the active period of the victim STA without violating the NSTR requirement that the end times of the DL transmissions on the NSTR link pair be aligned.

Referring now to FIG. 10C, as an alternative to the DL silence mode 1, the AP MLD may modify its own operation mode to enter a different DL silence mode (e.g., DL silence mode 2).

To do so, the AP MLD may switch the AP MLD to a single link operation mode using the second link of the NSTR link pair during the active period (step 1045), and instruct the second AP to complete a DL traffic transmission operation on the second link before the end of the active period (step 1050). DL traffic is thereby silenced on the first link during the active period of the victim STA without violating the NSTR requirement that the end times of the DL transmissions on the NSTR link pair be aligned.

Referring now to FIG. 10D, if the AP MLD determined to silence the UL traffic on the first link at step 1020, then at step 1025 the AP MLD may modify the operation mode of the non-AP MLD to cause it to enter a UL silence mode (e.g., UL silence mode 1).

To do so, at step 1055 the AP MLD may generate a message that instructs the non-AP MLD to take a number of actions to modify its operation, including instructing a first STA of the non-AP MLD that forms the first link to wait to begin a first UL traffic transmission on the first link until the active period has ended, instructing a second STA of the non-AP MLD that forms the second link of the NSTR link pair to wait to begin a second UL traffic transmission on the second link until the active period has ended, and instructing the first STA and the second STA to begin the first and second UL traffic transmissions simultaneously.

Then, at step 1060, the AP MLD transmits the message to the non-AP MLD. When the non-AP MLD modifies its operation according to the instructions in the message, UL traffic is silenced on the first link during the active period of the victim STA without violating the NSTR requirement that the start times of the UL transmissions on the NSTR link pair be aligned.

Referring now to FIG. 10E, as an alternative to the UL silence mode 1, the AP MLD may modify the operation mode of the non-AP MLD to cause it to enter a different UL silence mode (e.g., UL silence mode 2).

To do so, at step 1065 the AP MLD may generate a message that instructs the non-AP MLD to take a number of actions to modify its operation, including switching to a single link operation mode using the second link of the NSTR link pair during the active period, and instructing the second STA to complete a UL traffic transmission operation on the second link before the end of the active period.

Then, at step 1070, the AP MLD transmits the message to the non-AP MLD. When the non-AP MLD modifies its operation according to the instructions in the message, UL traffic is silenced on the first link during the active period of the victim STA without violating the NSTR requirement that the start times of the UL transmissions on the NSTR link pair be aligned.

Returning to FIG. 10A, after step 1025 the AP MLD sends, to the neighboring AP over the backhaul link, a MAP coordination response indicating that the first link will be silenced during the active period.

The above flowcharts illustrate an example method that can be implemented in accordance with the principles of the present disclosure and various changes could be made to the method illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An access point (AP) multi-link device (MLD), comprising:
   APs each comprising a transceiver configured to form a link with a corresponding station (STA) of a non-AP MLD, wherein at least two of the links form a non-simultaneous transmit/receive (NSTR) link pair; and
   a processor operably coupled to the APs, the processor configured to:
      obtain, via a backhaul link from a neighboring AP in a different basic service set (BSS), a multi-AP (MAP) coordination request that includes schedule information for a victim STA in the different BSS, and
      modify, based on the MAP coordination request and the schedule information, an operation mode of either the AP MLD or the non-AP MLD such that a first link of the NSTR link pair is silenced during an active period of the victim STA.

2. The AP MLD of claim 1, wherein the processor is further configured to:
   determine, based on the MAP coordination request, whether downlink (DL) traffic or uplink (UL) traffic on the first link causes interference at the victim STA, and
   determine to silence the DL traffic on the first link during the active period based on a determination that the DL traffic causes the interference, or
   determine to silence the UL traffic on the first link during the active period based on a determination that the UL traffic causes the interference.

3. The AP MLD of claim 1, wherein the processor is further configured to:
   instruct a first AP that forms the first link to wait to begin a first DL traffic transmission on the first link until the active period has ended, and
   instruct a second AP that forms a second link of the NSTR link pair to pad a second DL traffic transmission on the second link that begins during the active period, such that an end time of the second DL traffic transmission aligns with an end time of the first DL traffic transmission.

4. The AP MLD of claim 1, wherein the processor is further configured to:
   switch the AP MLD to a single link operation mode using a second link of the NSTR link pair during the active period, and
   instruct a second AP that forms the second link to complete a DL traffic transmission operation on the second link before the end of the active period.

5. The AP MLD of claim 1, wherein:
   the processor is further configured to generate a message that instructs the non-AP MLD to:
      instruct a first STA that forms the first link to wait to begin a first UL traffic transmission on the first link until the active period has ended;
      instruct a second STA that forms a second link of the NSTR link pair to wait to begin a second UL traffic transmission on the second link until the active period has ended; and
      instruct the first STA and the second STA to begin the first and second UL traffic transmissions simultaneously, and
   at least one of the transceivers is configured to transmit the message to the non-AP MLD.

6. The AP MLD of claim 1, wherein:
   the processor is further configured to generate a message that instructs the non-AP MLD to:
      switch to a single link operation mode using a second link of the NSTR link pair during the active period; and
      instruct a second STA that forms the second link to complete a UL traffic transmission operation on the second link before the end of the active period, and
   at least one of the transceivers is configured to transmit the message to the non-AP MLD.

7. The AP MLD of claim 1, wherein the processor is configured to send, to the neighboring AP over the backhaul link, a MAP coordination response indicating that the first link will be silenced during the active period.

8. A non-access point (AP) multi-link device (MLD) comprising:
   stations (STAs) each comprising a transceiver configured to form a link with a corresponding AP of an AP MLD, wherein at least two of the links form a non-simultaneous transmit/receive (NSTR) link pair; and a processor operably coupled to the STAs, the processor configured to modify, based on a multi-AP (MAP) coordination request and schedule information for a victim STA in a different basic service set (BSS), an operation mode of the non-AP MLD such that a first link of the NSTR link pair is silenced during an active period of the victim STA.

9. The non-AP MLD of claim 8, wherein the processor is further configured to modify the operation mode of the non-AP MLD based on a determination to silence uplink (UL) traffic on the first link during the active period based on a determination that the UL traffic causes interference at the victim STA.

10. The non-AP MLD of claim 8, wherein:
the transceiver of a first STA that forms the first link is further configured to receive a first downlink (DL) traffic transmission on the first link after the active period has ended,
the transceiver of a second STA that forms a second link of the NSTR link pair is further configured to receive a second DL traffic transmission on the second link after the active period has ended, and
the second DL traffic transmission is padded such that an end time of the second DL traffic transmission aligns with an end time of the first DL traffic transmission.

11. The non-AP MLD of claim 8, wherein:
the transceiver of a second STA that forms a second link of the NSTR link pair is further configured to receive a second DL traffic transmission on the second link under a single link operation mode that uses the second link, and
the second DL traffic transmission is completed before the end of the active period.

12. The non-AP MLD of claim 8, wherein:
at least one of the transceivers is configured to receive a message from the AP MLD that includes instructions for the non-AP MLD, and
the processor is further configured to, based on the instructions:
switch to a single link operation mode using a second link of the NSTR link pair during the active period; and
instruct a second STA that forms the second link to complete a UL traffic transmission operation on the second link before the end of the active period.

13. The non-AP MLD of claim 8, wherein:
at least one of the transceivers is configured to receive a message from the AP MLD that includes instructions for the non-AP MLD, and
the processor is further configured to, based on the instructions:
instruct a first STA that forms the first link to wait to begin a first UL traffic transmission on the first link until the active period has ended;
instruct a second STA that forms a second link of the NSTR link pair to wait to begin a second UL traffic transmission on the second link until the active period has ended; and
instruct the first STA and the second STA to begin the first and second UL traffic transmissions simultaneously.

14. A method of wireless communication performed by an access point (AP) multi-link device (MLD), the method comprising:
obtaining, via a backhaul link from a neighboring AP in a different basic service set (BSS), a multi-AP (MAP)

coordination request that includes schedule information for a victim station (STA) in the different BSS; and
modifying, based on the MAP coordination request and the schedule information, an operation mode of either the AP MLD or a non-AP MLD that forms a non-simultaneous transmit/receive (NSTR) link pair with the AP MLD, such that a first link of the NSTR link pair is silenced during an active period of the victim STA.

15. The method of claim 14, further comprising:
determining, based on the MAP coordination request, whether downlink (DL) traffic or uplink (UL) traffic on the first link causes interference at the victim STA; and
determining to silence the DL traffic on the first link during the active period based on a determination that the DL traffic causes the interference; or
determining to silence the UL traffic on the first link during the active period based on a determination that the UL traffic causes the interference.

16. The method of claim 14, further comprising:
instructing a first AP of the AP MLD that forms the first link to wait to begin a first DL traffic transmission on the first link until the active period has ended; and
instructing a second AP of the AP MLD that forms a second link of the NSTR link pair to pad a second DL traffic transmission on the second link that begins during the active period, such that an end time of the second DL traffic transmission aligns with an end time of the first DL traffic transmission.

17. The method of claim 14, further comprising:
switching the AP MLD to a single link operation mode using a second link of the NSTR link pair during the active period; and
instructing a second AP of the AP MLD that forms the second link to complete a DL traffic transmission operation on the second link before the end of the active period.

18. The method of claim 14, further comprising:
generating a message that instructs the non-AP MLD to:
instruct a first STA of the non-AP MLD that forms the first link to wait to begin a first UL traffic transmission on the first link until the active period has ended,
instruct a second STA of the non-AP MLD that forms a second link of the NSTR link pair to wait to begin a second UL traffic transmission on the second link until the active period has ended, and
instruct the first STA and the second STA to begin the first and second UL traffic transmissions simultaneously; and
transmitting the message to the non-AP MLD.

19. The method of claim 14, further comprising:
generating a message that instructs the non-AP MLD to:
switch to a single link operation mode using a second link of the NSTR link pair during the active period; and
instruct a second STA of the non-AP MLD that forms the second link to complete a UL traffic transmission operation on the second link before the end of the active period, and
transmitting the message to the non-AP MLD.

20. The method of claim 14, further comprising sending, to the neighboring AP over the backhaul link, a MAP coordination response indicating that the first link will be silenced during the active period.

* * * * *